United States Patent [19]
Chaussonnet

[11] Patent Number: 5,730,947
[45] Date of Patent: Mar. 24, 1998

[54] SYSTEM AND PROCESS FOR VACUUM THERMOLYSIS TREATMENT OF LIQUID OR GAS PRODUCTS THE DISPOSAL OF WHICH IS DETRIMENTAL TO THE ENVIRONMENT

[75] Inventor: Pierre Chaussonnet, Aix-en-Provence, France

[73] Assignee: Societe Francaise De Thermolyse, France

[21] Appl. No.: 628,401

[22] Filed: Apr. 5, 1996

Related U.S. Application Data

[63] Continuation of Ser. No. 335,742, Nov. 15, 1994, abandoned.

[30] Foreign Application Priority Data

Jan. 24, 1991 [FR] France .................... 91 01063

[51] Int. Cl.[6] ........................................ B01D 50/00
[52] U.S. Cl. .................. 422/177; 422/169; 422/174; 422/188
[58] Field of Search ..................... 422/169, 170, 422/171, 174, 176, 177, 180, 182, 183, 188, 189, 197, 109, 112, 115

[56] References Cited

U.S. PATENT DOCUMENTS

| | | | |
|---|---|---|---|
| 4,370,301 | 1/1983 | Doi et al. | 422/5 |
| 4,874,587 | 10/1989 | Galloway | 422/189 |
| 5,051,241 | 9/1991 | Pfefferle | 422/180 |
| 5,108,717 | 4/1992 | Deller et al. | 422/183 |
| 5,427,738 | 6/1995 | Galloway | 422/173 |

FOREIGN PATENT DOCUMENTS 0295454  5/1988  European Pat. Off. .

Primary Examiner—Christopher Kim
Attorney, Agent, or Firm—Vanophem Meehan Vanophem, P.C.

[57] ABSTRACT

System for the treatment of liquid and gas products, the disposal of which is detrimental to the environment. The system has a single thermolysis reactor, a chamber for feeding the liquid or gas products to be treated, an intermediate disk for the passage of the gas to be treated, a thermolysis chamber in which the thermo-catalytic-decomposition takes place and a purification chamber in which are selectively retained for elimination chemical elements released by thermo-catalytic-decomposition.

14 Claims, 3 Drawing Sheets

5,730,947

SYSTEM AND PROCESS FOR VACUUM THERMOLYSIS TREATMENT OF LIQUID OR GAS PRODUCTS THE DISPOSAL OF WHICH IS DETRIMENTAL TO THE ENVIRONMENT

This is a continuation, of application Ser. No. 08/335,742, filed Nov. 15, 1994, abandoned.

BACKGROUND OF THE INVENTION

The present invention concerns a system and process for vacuum thermolysis treatment of liquid or gas products, the disposal of which is detrimental to the environment. Products hazardous to the environment are conventionally either stored or incinerated; in the former case the potential hazard remains and can only become aggravated by possible corrosion of the packaging. In the latter case incineration temperatures are very high (in excess of 1,000° C.) and cause rapid wear of the plant and therefore very high operating costs; what is more, the gaseous products of incineration are vented to the atmosphere without any form of control which makes it impossible to provide all the required guarantees of non-pollution of the environment.

An object of the invention is to remedy these drawbacks by means of a system for processing liquid or gas products whereby at a moderate temperature (typically 500° C. to 900° C., depending on the products to be processed) sufficient decomposition for fixing and eliminating harmful components that can be detrimental to the environment can be achieved.

SUMMARY OF THE INVENTION

To this end the invention proposes vacuum thermolysis (i.e. thermolysis at a subatmospheric pressure, typically less than 500 mbars, for example around 300 mbars) and continuous purification of the products of decomposition at the outlet. The products of decomposition are preferably monitored continuously at the outlet in order to be either disposed of or recycled for another cycle of processing.

Operation at temperatures below 1,000° C. does not cause any marked wear of the processing system, so that its service life is extended and its operating cost is reduced.

To be more precise, the invention proposes a system for processing liquids and gases whose disposal is detrimental to the environment characterized in that it includes in a single thermolysis reactor, a chamber into which liquid or gas products to be processed are fed, an intermediate disk allowing gases to be processed to pass through it, a thermolysis chamber in which thermo-catalytic decomposition takes place, and a purification chamber in which chemical elements released by the thermo-catalytic decomposition and to be eliminated are selectively retained.

In accordance with preferred and possibly combinable features of the invention:

the system includes a combustible gaseous medium feed pipe charging into the thermolysis chamber or at the upstream end thereof;

the feed chamber is provided with a heating system for vaporizing the liquid part of products to be processed introduced into the chamber and heating the gaseous mixture to a set point temperature;

the intermediate disk has orifices of calibrated size for regular transfer of gaseous products to the thermolysis chamber at a flow rate determined by the temperature and pressure conditions in the feed chamber and the pressure in the thermolysis chamber;

the thermolysis chamber contains a thermo-catalytic system embodying electric elements connected to an electrical power supply and a thermo-catalytic material, the thermo-catalytic system being heated electrically to a temperature enabling catalytic decomposition of the gas mixture, the additional energy required for thermolytic decomposition of the products to be processed being obtained by catalytic decomposition of the air/oxygen-combustible gas mixture;

the purification chamber includes a lining of reactive materials adapted to have the decomposed gases flow through them in order to selectively eliminate radicals to be eliminated;

the reactive materials are installed in the form of removable cartridges for ease of manipulation and for regeneration after use;

the system includes means for modulating the temperature of a catalytic mass contained in the thermolysis chamber; to maintain the vacuum in the thermolysis chamber, the system includes, connected to the outlet of the reactor, a pumping set preceded by washing means adapted to further purify and cool the gases to a temperature compatible with the pumping set;

the hardness of the vacuum obtained in the thermolysis chamber is controlled in accordance with indications of a pressure gauge fixed to the reactor on the downstream side of the intermediate disk, by modulation of the flow rate of the pumping set;

the thermolysis reactor is thermally insulated to reduce heat losses and the intermediate disk, a thermo-catalytic system contained in the thermolysis chamber, and active materials contained in the purification chamber are removably installed; and the system for processing liquids and gases whose disposal is detrimental to the environment includes, on the downstream side of the thermolysis reactor outlet, a gas analyzer controlling valves to route the processed gases either to a disposal path or to the entry of the thermolysis reactor.

The invention also proposes a process of processing liquids and gases whose disposal is detrimental to the environment, in which the liquids and the gases are fed into a feed chamber in which the liquids are vaporized. The vaporized liquids and the gases are passed into a thermolysis chamber in which a vacuum is maintained in operation, in contact with a catalytic mass heated to a temperature adapted to catalyze thermolytic decomposition of the vaporized liquids and the gases, and the vaporized liquids and the gases are passed into a purification chamber containing elements adapted to selectively retain predetermined substances released by decomposition.

In accordance with further preferred features of the invention:

the gaseous products leaving the purification chamber are washed, tested for the presence of harmful substances, and then either disposed of or recycled into the feed chamber;

the vacuum is controlled in operation by the flow rate at which the gaseous products are pumped at the exit from the purification chamber; and the gaseous products are pumped after washing and cooling them.

In conformity with the conditions mentioned hereinabove, the system of the invention offers the following advantages: it can be applied to any quantity of liquid or gas, either by modifying the cross section of the reactor and the length of the thermolysis chamber or by connecting in parallel as many reactors as necessary. The system of the invention does not cause any contamination by the gases which are purged of harmful components, firstly in the purification chamber and secondly in the washer on the upstream side of the pumping set; and the installation and operating costs are low as compared with those of incinerator systems.

Objects, features and advantages of the invention emerge from the following description given by way of non-limiting example with reference to the appended drawings.

DETAILED DESCRIPTION OF THE PREFERRED EMBODIMENT

Figure 1:
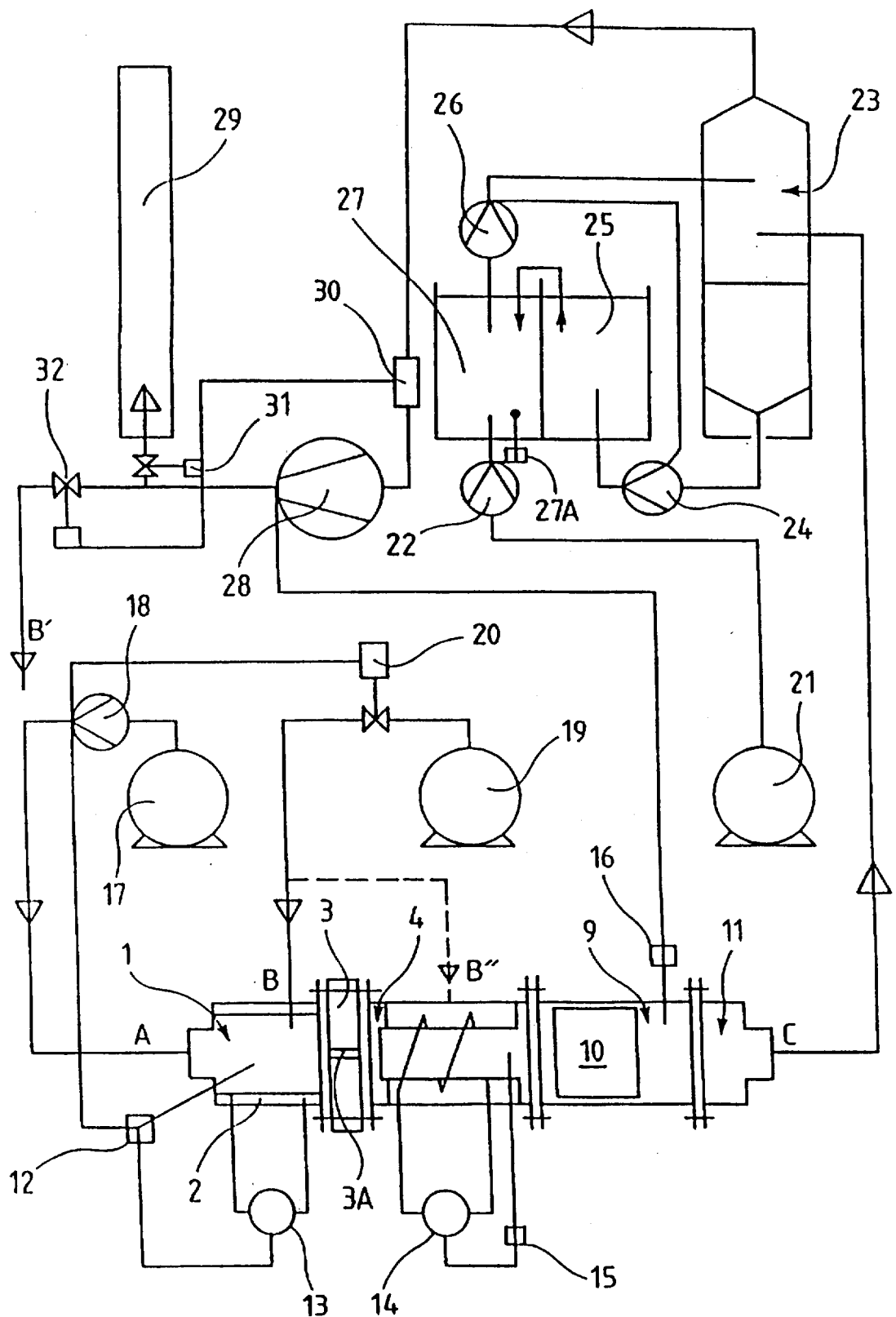
FIG. 1 is a block schematic of an installation in accordance with the invention for processing liquid or gaseous waste.

Referring to FIG. 1, liquids (and gases) to be processed reach a feed chamber 1 through an inlet A from barrels or from a storage tank 17 from which they are fed by a metering pump 18. As an alternative, the chamber can be fed by gravity.

On the upstream side of the feed chamber the reactor has a conventional plant (not shown) for preventing escape of the products to the outside and ingress of air; to give a non-limiting example of such means, a barometric seal leg can prevent ingress of air and check valves can prevent escape of the liquid and the gases to the exterior.

A combustible gas mixture (air/oxygen-combustible gas) is fed into the feed chamber 1 via an inlet B from a storage tank 19, passing through a pressure gauge/pressure regulator 20 whose flow rate is slaved to the flow rate of the metering pump 18. The feed chamber 1 has heating means, in this example an electric heater element 2 located against the wall, on the outside of the enclosure, to vaporize the liquid part of the products to be processed, to heat the resulting vapor and to mix the vapor with the air and/or the oxygen arriving at the inlet B. The electric current heating the heater element 2 is controlled (at 13) on the basis of measurement (at 12) of the vapor pressure of the vaporized liquid-air-gas mixture in the feed chamber 1, for which there is a fixed set point for each mixture processed.

An intermediate disk 3 is fixed and sealed to the exit from the feed chamber 1. The intermediate disk 3 embodies holes 3A of calibrated size through which the gaseous mixture and the gaseous or vaporized products to be processed are transferred to a thermolysis chamber 4 including a thermoreactor or a thermo-catalytic system and to which the disk is fixed and sealed; the transfer flow rate is dependent on the temperature and the pressure in the feed chamber 1 and on the pressure in the thermolysis chamber 4. It is regulated by modifying these parameters and the flow rate of the metering pump 18.

In an alternate embodiment of the invention the combustible gaseous mixture fed to the thermolysis chamber 4 is not via the inlet B discharging into the upstream end of the thermolysis chamber 4 but via a pipe or inlet B" (shown in dashed outline) discharging directly into the thermolysis chamber 4.

The thermolysis chamber 4 communicates with and is sealed to a purification chamber 9 closed at its downstream end by an end wall 11 and adapted to purify the products of the thermolytic decomposition taking place in the thermolysis chamber 4. The products of the composition leave via an outlet C in the end wall 11.

The chambers or other components 1, 4, 9 and 11 are assembled and sealed together by means of flanges and gaskets (or even by welding) to form a reactor.

A vacuum (i.e. a subatmospheric pressure typically less than 800 mbars) is maintained at all times in the thermolysis chamber 4 and the purification chamber 9, the absolute pressure in the thermolysis chamber 4 varying with the nature of the products to be processed. This pressure is 300 mbars, for example.

The products of decomposition enter a washing column or "scrubber" 23 in which they are washed and cooled by vigorously sprayed water. The washing water is taken off by a pump 24 whose flow rate is slaved to that of a sprayer pump 26 spraying the water into the column 23. The flow rate of the sprayer pump 26 depends on the volume and the temperature of the decomposition gases entering the column 23. The washing water pumped from the outlet at the bottom of the column 23 by the pump 24 is fed first to a settling and cooling installation 25 and then to a neutralization installation 27 into which a neutralizing solution, such as a soda solution, for example, is fed as required. This solution is taken from a tank 21 by a metering pump 22 whose flow rate is controlled by the output of a monitoring device 27A such as a pH meter, for example. In the example shown here, the spray water pumped by the pump 26 is taken from the upper part of the tank 27.

The washed and cooled gases are aspirated from the outlet at the top of the column 23 by a pumping set 28 (provided with vacuum pumps and heat exchangers, for example) which maintain the volumes of the thermolysis chamber, purification chamber and washer column at the required vacuum (typically 300 mbars—see above). The operation of the pumping set 28 and therefore the hardness of the vacuum in the installation are controlled in this example in accordance with the pressure in the purification chamber 9 as measured by a sensor 16.

Before they enter the pumping set 28 the gases flow through a gas analyzer 30 which, depending on the results, and by operating valves 31 and 32 on the downstream side of the pumping set 28, directs the gases either into a chimney 29 or to a second input B' of the feed chamber 1 so that they are recycled and processed again.

The washing column has a two-fold function in that, firstly, it continues the process of purification and, secondly, it cools the gas to a temperature acceptable for the pumping set 28.

Figure 2:
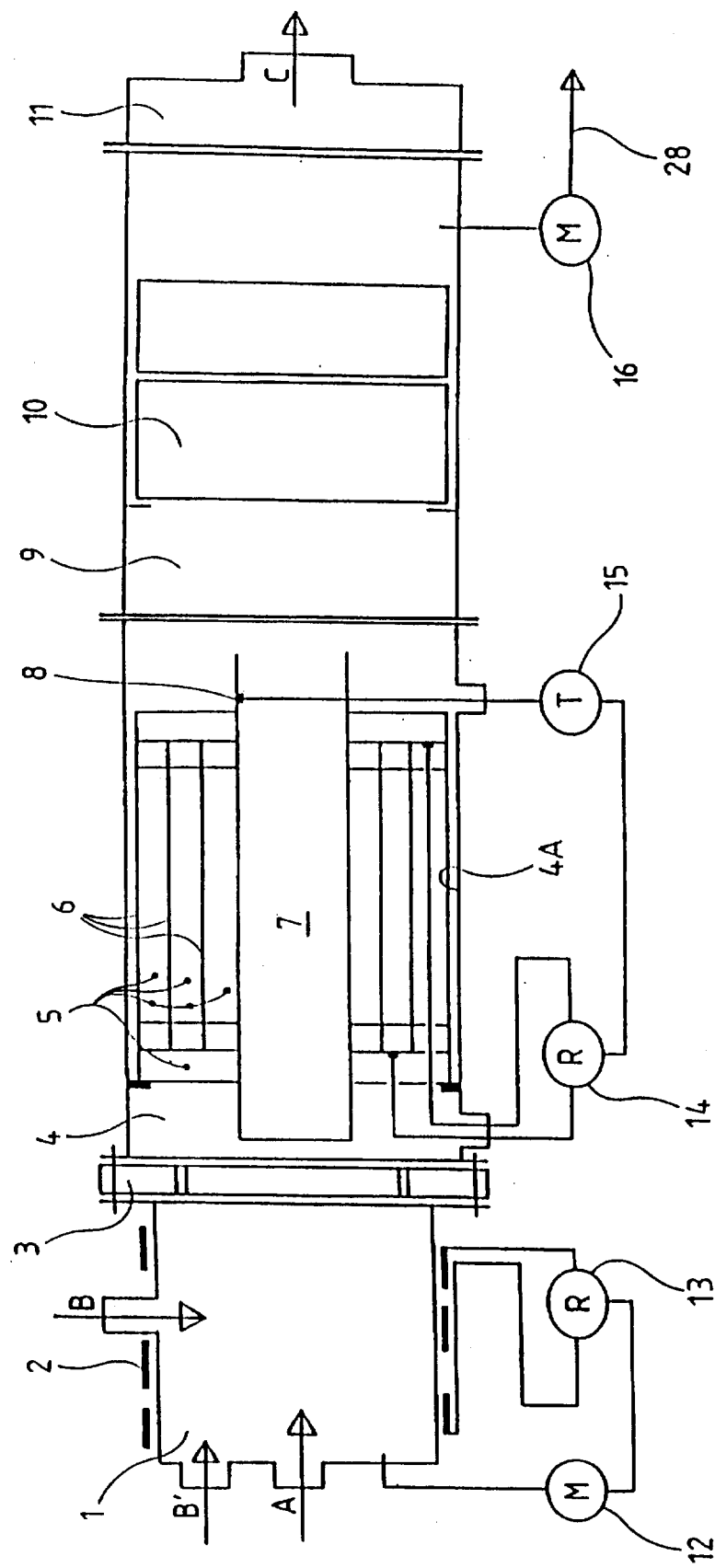
FIG. 2 is a schematic axial cross section through the thermolysis reactor of the FIG. 1 installation.

FIG. 2 shows by way of non-limiting illustrative example only an industrial implementation of the thermolysis reactor combining the feed chamber 1, thermolysis chamber 4 and purification chamber 9. The reactor is shown horizontal here, but it can operate in the same manner if vertical. The position can be chosen according to local installation conditions.

The liquids arrive at the inlet A either by gravity feed or pumped by a metering pump. The air/oxygen-combustible gas mixture arrives at the inlet B. The gases to be processed or recycled after passing through the pumping set 28 arrive at the inlet B'. The feed chamber 1 is heated by the electric elements 2 in order to vaporize the liquids to be processed and to heat the gas mixture. Heating is controlled by the electric power regulator 13 according to the pressure as measured by the pressure gauge 12.

The holes in the intermediate disk 3 through which the hot gas mixture flows from the feed chamber 1 into the thermolysis chamber 4 are distributed along circumferential lines and have a flow cross section chosen to guarantee the required gas mixture flow rate in accordance with the variable parameters: upstream pressure and temperature (at 1), downstream pressure (at 4). The design of the intermediate disk 3 depends on the physical and chemical characteristics of the products to be processed. Mounting the intermediate disk 3 between respective flanges of the feed and thermolysis chambers 1 and 4 makes it easy to replace the intermediate disk 3 when the products are changed.

In components 5, 6 and 7 of the thermoreactor (or thermolyzer) described below is where the thermo-catalytic decomposition reaction takes place: a porous catalytic mass 5 in which a gas mixture and the products to be processed circulate, electric heater elements, in this example in the form of radiant electric tubes 6 passing longitudinally through the catalytic mass to heat the latter to the temperature of the decomposition reaction and to supply the further energy needed to dissociate the molecules of the gas by means of the porous mass 5, and a tube 7 on which the catalytic mass 5 is mounted and which is plugged (here at its upstream end) to prevent the flow of gas outside the porous mass 5. A thermocouple 15 with a temperature outlet 8 gives an indication of temperature for controlling the chemical dynamics of decomposition by regulation of the input of electrical energy by means of a power regulator 14. The thermoreactor is removably housed in a thermolysis enclosure 4A and sealed thereto in order to prevent the gases from circumventing the porous mass 5 by flowing along the thermolysis enclosure 4A.

In FIG. 2 the radiant tubes 6 are concentric (there are three tubes nested one within the other) and are connected to an electrical power supply, i.e. the regulator 14, by spacers at their upstream and downstream ends which provide both the electrical connection and mechanical stiffness. The tubes therefore conjointly form a single heater element heating the porous mass 5 homogeneously.

The radiant tubes 6 of the thermolysis chamber 4 are filled with materials constituting the porous mass 5, so that the gas flow is sufficiently slow and turbulent to promote heat exchange; the nature of the filling material(s) is determined to suit the stability characteristics of the product, in order to catalyze its decomposition.

Figure 3:
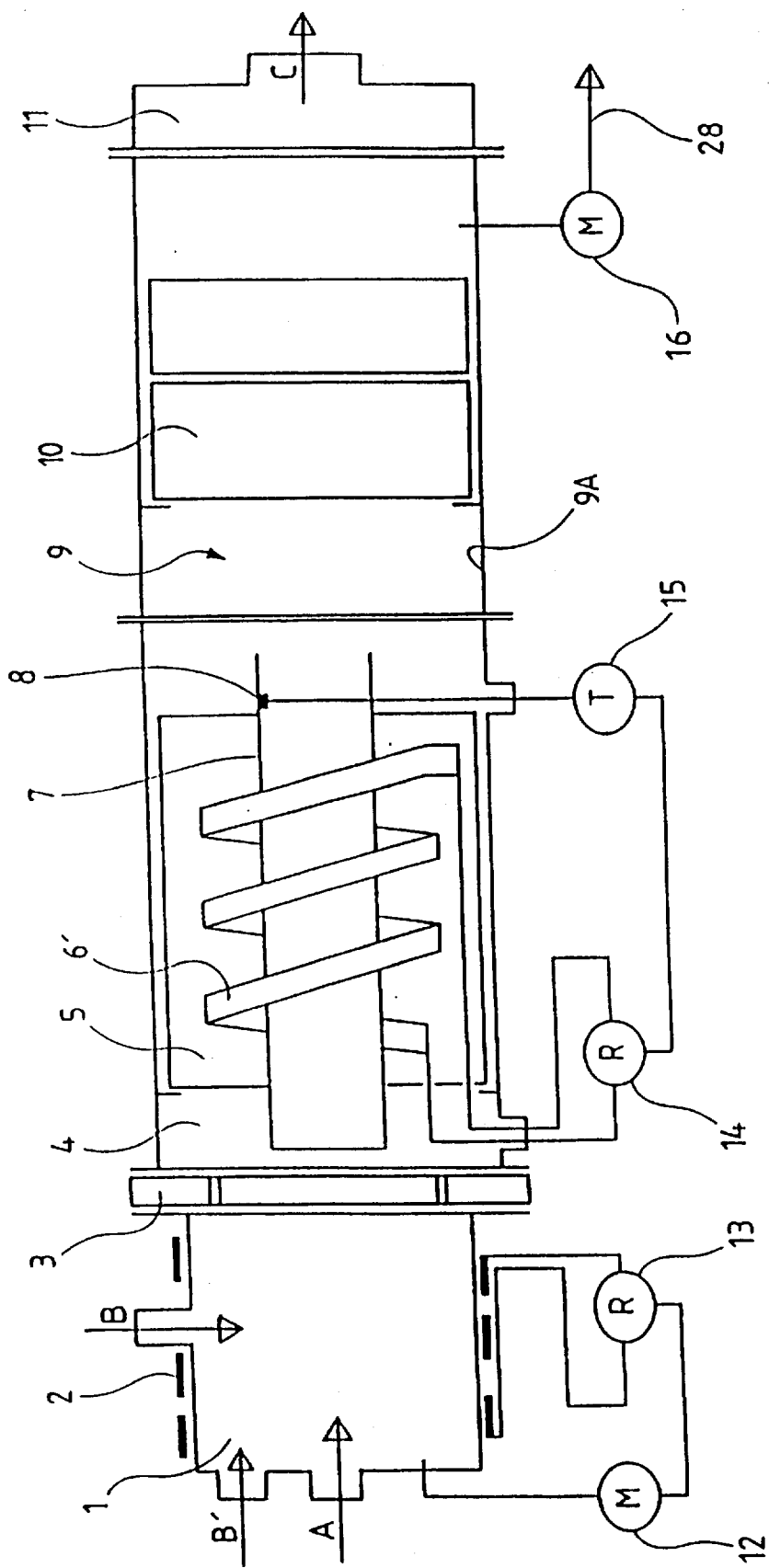
FIG. 3 is a schematic representation of an alternate embodiment of the reactor.

FIG. 3 shows an alternate design of the thermoreactor, in which the radiant tubes are replaced by a heater element 6' embedded in the porous catalytic mass 5 in a helix around the central tube 7. It heats the porous catalytic mass 5 to the temperature required to instigate the decomposition reactions. Items in FIG. 3 similar to items in FIG. 2 are identified by the same reference numbers. The porous mass 5 in this embodiment is advantageously confined in a porous mass enclosure (not shown).

The energy required for thermo-catalytic decomposition of the products to be processed is introduced by raising the temperature of the gas mixture in the feed chamber 1, by raising the temperature of the radiant tubes and the electric elements and by the catalytic decomposition of the air/oxygen-combustible gas mixture in the material of the thermo-catalytic system.

The reaction dynamics of decomposition in the thermolyzer are controlled by regulating the electrical heating on the basis of data from thermocouples installed in the reactor and by the use of conventional electric current control systems, for example thyristor-based systems.

An enclosure 9A of the purification chamber 9 contains cartridges 10 (in this example two consecutive cartridges) of active elements whose function is to retain by physical and chemical means the chemical radicals (especially halogens) resulting from thermolytic decomposition and to be eliminated. These active elements depend on the products to be processed.

The cartridges 10 occupy all of the interior cross section of the enclosure 9A; they are removable and are changed when purification is no longer sufficient, as indicated by the gas analyzer 30. They can then be regenerated and replaced. The successive cartridges 10 can be of different kinds to fix different chemical radicals. Purification can therefore be selective and progressive. The pressure sensor 16 on the downstream side of the cartridges 10 indicates the hardness of the vacuum so that the pressure can be set to the required value by modifying the flow rate of the pumping set 28. The decomposed and purified gases leave the reactor via the outlet C in the end wall 11.

The catalytic reactor is thermally insulated over all of its length between inlet A and outlet C to minimize heat losses.

To process "1-1-dichloroethane" arriving at a mean flow rate of 1 kg/s, for example, a disk has a hole in it with a cross section of 0.35 $cm^2$. The catalytic mass has a length of 1.2 m and the cross section of the gas flow passage is 400 $cm^2$. The mass is based on platinum oxide. The purification cartridges are based on dolomite to fix chlorine compounds released during catalytic decomposition.

In this application the combustible mixture is fed directly into the thermolysis chamber in line with the catalyzer via the inlet or pipe B'. It is 960 g/s of oxygen and 540 g/s of propane ($C_3H_8$).

The target pressure in the feed chamber 1 is 3 bars and the set point temperature is 480K.

The vacuum in the thermolysis chamber 4 is 0.6 bar and the porous mass 5 is held at a temperature in the order of 1,000K.

It goes without saying that the above description has been given by way of non-limiting example only and that many variants can be proposed by the person skilled in the art without departing from the scope of the invention.

I claim:

1. A system for processing gaseous products to be processed, the disposal of which is detrimental to the environment, comprising:

a feed chamber (1) into which gas products to be processed are fed;

means for supplying an air/oxygen-combustible mixture to the feed chamber;

means for feeding the gas products to be processed, the feeding means being connected to the feed chamber;

an intermediate disk (3) located with respect to the feed chamber, the intermediate disk having a plurality of orifices for allowing gases to be processed to pass through the intermediate disk;

a thermolysis chamber (4) having a vacuum applied thereto such that the thermolysis chamber is continuously at sub-atmospheric pressure, the thermolysis chamber for the thermo-catalytic decomposition of the gaseous products to be processed, the intermediate disk located between the feed chamber and the thermolysis chamber, which are detrimental to the environment, wherein the thermolysis chamber contains a thermo-catalytic system comprising electric elements connected to an electric power supply and a thermocatalytic material, the thermo-catalytic system being heated electrically to a temperature enabling catalytic decomposition of the gaseous products to be processed, the additional energy required for thermocatalytic decomposition of the products to be processed being obtained by catalytic decomposition of the air/oxygen combustible gas mixture; and a purification chamber (9) for selectively retaining chemical elements of the gases released during the thermo-catalytic decomposition which are detrimental to the environment.

2. A system according to claim 1 wherein the supplying means comprises a combustible gaseous medium feed pipe (B) charging into the feed chamber.

3. A system according to claim 1 for processing liquids and gaseous products to be processed wherein the feed chamber (1) comprises a heating system (2) for vaporizing the liquids to be processed and heating the gases to be processed to a set point temperature.

4. A system according to claim 1 wherein the intermediate disk (3) to be processed has orifices of calibrated size for transfer of gaseous products to the thermolysis chamber (4) at a flowrate determined by the temperature and pressure conditions in the feed chamber (1) and the pressure in the thermolysis chamber (4).

5. A system according to claim 1 wherein the purification chamber (9) comprises a medium (10) of reactive materials aligned in the purification chamber to completely cover the purification chamber's cross section, the medium of reactive materials having the decomposed gases flow therethrough to eliminate selectively radicals carried by the decomposed gas flow.

6. A system according to claim 5 further comprising a removable cartridge containing the medium of reactive materials, the removable cartridge for ease of manipulation and for regeneration after use.

7. A system according to claim 1 further comprising:

a catalytic mass (5) located in the thermolysis chamber; and means (14, 15) for modulating the temperature of the catalytic mass (5) contained in the thermolysis chamber.

8. A system according to claim 1 further comprising:

a pumping set (28) connected to the purification chamber; and a washing means (23) to purify further and cool the gases exiting the purification chamber to a temperature compatible with the pumping set.

9. A system according to claim 8 further comprising:

means for controlling the vacuum obtained in the thermolysis chamber (4) in accordance with indications of a pressure gauge (16) fixed to a reactor on the downstream side of the intermediate disk, by modulation of the flowrate of the pumping set (28).

10. A system according to claim 1 further comprising thermal insulation to reduce heat losses and wherein the intermediate disk (3), the thermo-catalytic system (5, 6, 7) contained in the thermolysis chamber, and active materials (10) contained in the purification chamber are installed removably.

11. A system according to claim 1 further comprising:

a gas analyzer controlling valve located on the downstream side of a reactor outlet, the gas analyzer controlling valve for routing the processed gases either to a disposal path (29) or to the feed chamber of the reactor.

12. A system according to claim 1 wherein the thermolysis chamber is continuously at a sub-atmospheric pressure of 0.6 bars.

13. A system according to claim 1 wherein the thermolysis chamber is continuously at a sub-atmospheric pressure of 500 millibars.

14. A system according to claim 1 wherein the thermolysis chamber is continuously at a sub-atmospheric pressure of 300 millibars.

* * * * *